(12) United States Patent
Carson et al.

(10) Patent No.: US 7,076,040 B2
(45) Date of Patent: Jul. 11, 2006

(54) GENERATING CALL DETAIL RECORDS

(75) Inventors: Douglas John Carson, Edinburgh (GB); Stuart McDonald, Edinburgh (GB); David Moir Archibald, Midlothian (GB); Jeffery Tomberlin, Colorado Springs, CO (US)

(73) Assignee: Agilent Technologies Inc., Palo Alto, CA (US)

( * ) Notice: Subject to any disclaimer, the term of this patent is extended or adjusted under 35 U.S.C. 154(b) by 822 days.

(21) Appl. No.: 10/222,994

(22) Filed: Aug. 19, 2002

(65) Prior Publication Data

US 2003/0009557 A1    Jan. 9, 2003

Related U.S. Application Data

(63) Continuation-in-part of application No. 09/834,046, filed on Apr. 12, 2001, now abandoned.

(51) Int. Cl.
*H04M 15/00* (2006.01)
*H04L 12/66* (2006.01)

(52) U.S. Cl. ................... 379/115.01; 370/356; 370/401

(58) Field of Classification Search ................ 379/111, 379/112.01, 112.08, 112.09, 114.01, 114.03, 379/115.01, 115.03, 121.05, 126, 127.01; 370/356, 401
See application file for complete search history.

(56) References Cited

U.S. PATENT DOCUMENTS

| 6,078,647 | A | 6/2000 | D'Eletto |
| 6,240,091 | B1 | 5/2001 | Ginzboorg et al. |
| 6,324,279 | B1 | 11/2001 | Kalmanck et al. |
| 6,327,350 | B1 | 12/2001 | Spangler et al. |
| 6,363,065 | B1 | 3/2002 | Thronton et al. |
| 6,385,301 | B1 | 5/2002 | Nolting et al. |
| 6,614,781 | B1 * | 9/2003 | Elliott et al. ................ 370/352 |
| 6,687,360 | B1 * | 2/2004 | Kung et al. ............ 379/211.02 |
| 6,724,747 | B1 | 4/2004 | Arango et al. |
| 2004/0022237 | A1 * | 2/2004 | Elliott et al. ................ 370/356 |

FOREIGN PATENT DOCUMENTS

| EP | 1 091 552 A2 | 4/2001 |
| EP | 0 924 918 A2 | 6/2003 |
| WO | WO 00 22792 | 4/2000 |

* cited by examiner

*Primary Examiner*—Binh K. Tieu

(57) ABSTRACT

Request and response messages conforming to a protocol such as Media Gateway Control Protocol between media gateways and a media gateway controller are examined to enable them to be correlated. The correlated messages are assembled to produce a call detail record describing a voice or data call established over an IP network via the media gateways under the control of the media gateway controller.

20 Claims, 6 Drawing Sheets

| Call Detail Record # 9999-9999 | |
| --- | --- |
| Call start time | 09:53 |
| Call end time | 09:57 |
| Called party number | 555-1234 |
| Calling party number | 543-9876 |
| Gateway IP addresses & endpoint names | 197.19.72.5 : p1@rgw01<br>56.77.32.19 : t1@tgw01 |
| Voice connection IP addresses & port nos | 208.1.2.3, port 48<br>208.1.2.5, port 1029 |
| Call performance metrics | (Jitter, delay, loss etc.) |
| Message 1 | NTFY 1230 p1@rgw01 (O: hd) |
| Message 2 | 200 1230 |
| Message 3 | RQNT 3230 p1@rgw01 (S: dl) |
| Message 4 | 200 3230 |

Fig.5

GENERATING CALL DETAIL RECORDS

RELATIONSHIP TO CO-PENDING APPLICATION

This application is a continuation-in-part of co-pending U.S. patent application Ser. No. 09/834,046 filed Apr. 12, 2001 now abandoned.

TECHNICAL FIELD

This invention relates to the generation of call detail records for telephone calls and other telecommunications services which are provided through gateways enabling interworking between networks using different networking technologies. For example, the invention has utility for monitoring communications coupled by a Media Gateway between a circuit-switched network and an internet-protocol (IP) network, under the control of a Media Gateway Controller (MGC) using the Media Gateway Control Protocol (MGCP) or the MEGACO/Megacop protocol.

BACKGROUND ART

Existing circuit-switched telecommunications networks, for example the international public switched telephone network (PSTN), are typically configured so that equipment (such as switches) in the transmission or bearer network, which carries user traffic (voice and data signals), is co-located with equipment (such as signalling points) in the associated signalling network, which carries control signals for co-ordinating the operation of the bearer network.

However, attention is now being directed to the possibility of telecommunications networks comprising distributed telecommunications switches, in which there is a separation of the switching/adaptation functionality from the signalling functionality. Furthermore, consideration is being given to the possibility of connecting dissimilar such networks (i.e. networks relying on different bearer technologies and/or signalling protocols).

Dissimilar telecommunications networks are typically interconnected via a "gateway" which provides the necessary conversions or adaptations between the bearer traffic and signalling protocol in each of the networks. In such an architecture control devices such as Media Gateway Controllers can be physically remote from the adaptation devices, such as Media Gateways. Media Gateway Controllers (also referred to as call agents or softswitches) can communicate with the Media Gateways they control using protocols such as Simple Gateway Control Protocol (SGCP), Media Gateway Control Protocol (MGCP—IETF RFC 2705), and the Megacop/H.248 protocol currently being defined. Media Gateway Controllers communicate with each other using extensions of current Call Control protocols such as Signalling System No.7 ISDN User Part (SS7 ISUP), Session Initiation Protocol (SIP—IETF RFC 2543), or ITU Recommendation H.323. New protocols may be defined for this interface in the future.

Protocol monitoring applications, such as tracing across a signalling network the protocol messages associated with a call, or building Call Data Records (CDRs) to summarise the key parameters relating to a call, require the ability to correlate across different protocols, which may refer to a single entity in multiple different, inconsistent ways. It is an object of this invention to facilitate such correlation.

DISCLOSURE OF INVENTION

According to one aspect of this invention there is provided a method of generating a call detail record for a telecommunications call established via a media gateway under the control of a media gateway controller, comprising the steps of:
  detecting messages exchanged between media gateways and at least one media gateway controller;
  locating identification information within the messages;
  associating command messages with corresponding response messages in accordance with a first kind of identification information;
  associating command and response messages relating to a specific gateway in accordance with a second kind of identification information;
  associating messages relating to different gateways in accordance with a third kind of identification information; and
  combining the messages which have been associated with one another to produce a call detail record.

According to another aspect of this invention there is provided apparatus for generating a call detail record for a telecommunications call established via a media gateway under the control of a media gateway controller, comprising:
  a monitor for detecting messages exchanged between media gateways and at least one media gateway controller;
  a locator for locating identification information within the messages;
  an associator for associating command messages with corresponding response messages in accordance with a first kind of identification information, for associating command and response messages relating to a specific gateway in accordance with a second kind of identification information, and for associating messages relating to different gateways in accordance with a third kind of identification information; and
  a combiner for combining the messages which have been associated with one another to produce a call detail record.

BRIEF DESCRIPTION OF DRAWINGS

A method and apparatus in accordance with this invention, for correlating gateway command and response messages, will now be described, by way of example, with reference to the accompanying drawings, in which:

FIG. 5 shows an example of part of a call detail record created by the procedure of FIGS. 4a and 4b.

BEST MODE FOR CARRYING OUT THE INVENTION, & INDUSTRIAL APPLICABILITY

Figure 1:
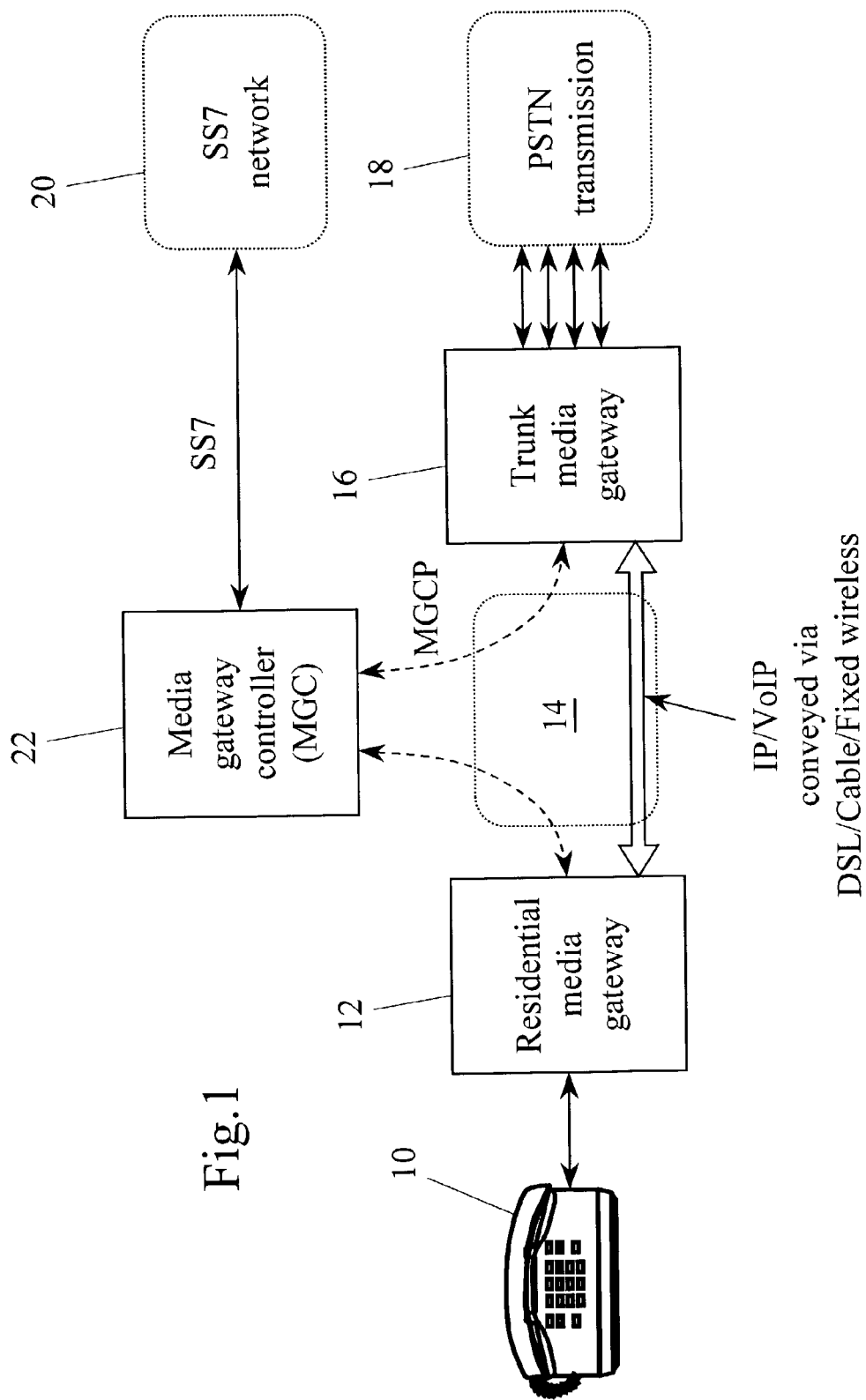
FIG. 1 shows the topology of an exemplary network incorporating multiple telecommunications media and distributed switches.

FIG. 1 shows the primary features of a network for coupling voice telephony and data signals from customer premises equipment (CPE) via an IP packet-switched network to the PSTN. Referring to FIG. 1, the CPE 10 (analogue phone, personal computer modem etc.) is coupled to a residential media gateway 12, which provides media and signalling conversion functions for transporting voice/data signals from the CPE via an IP network 14 to a second, trunk media gateway 16. The IP network 14 may be implemented, for example, using digital subscriber line (DSL), cable or fixed wireless technology.

The trunk media gateway 16 provides media and signalling conversion functions for transmission of the voice/data signals onwards over the PSTN, as indicated at 18, the operation of which is co-ordinated by an associated signalling network 20 operating in accordance with the Signalling System no.7 (SS7) protocol.

Operation of the media gateways 12 and 16 to set up a call through the IP network 14 (for example to allocate IP resources within each gateway and communicate related operational information between the gateways) is co-ordinated by an MGC 22. This MGC communicates with the gateways 12 and 16 by using MGCP messages (over IP-based signalling links indicated by dashed lines) and with other nodes in the signalling network 20 (e.g. other MGC's) by using SS7 messages.

Figure 2:
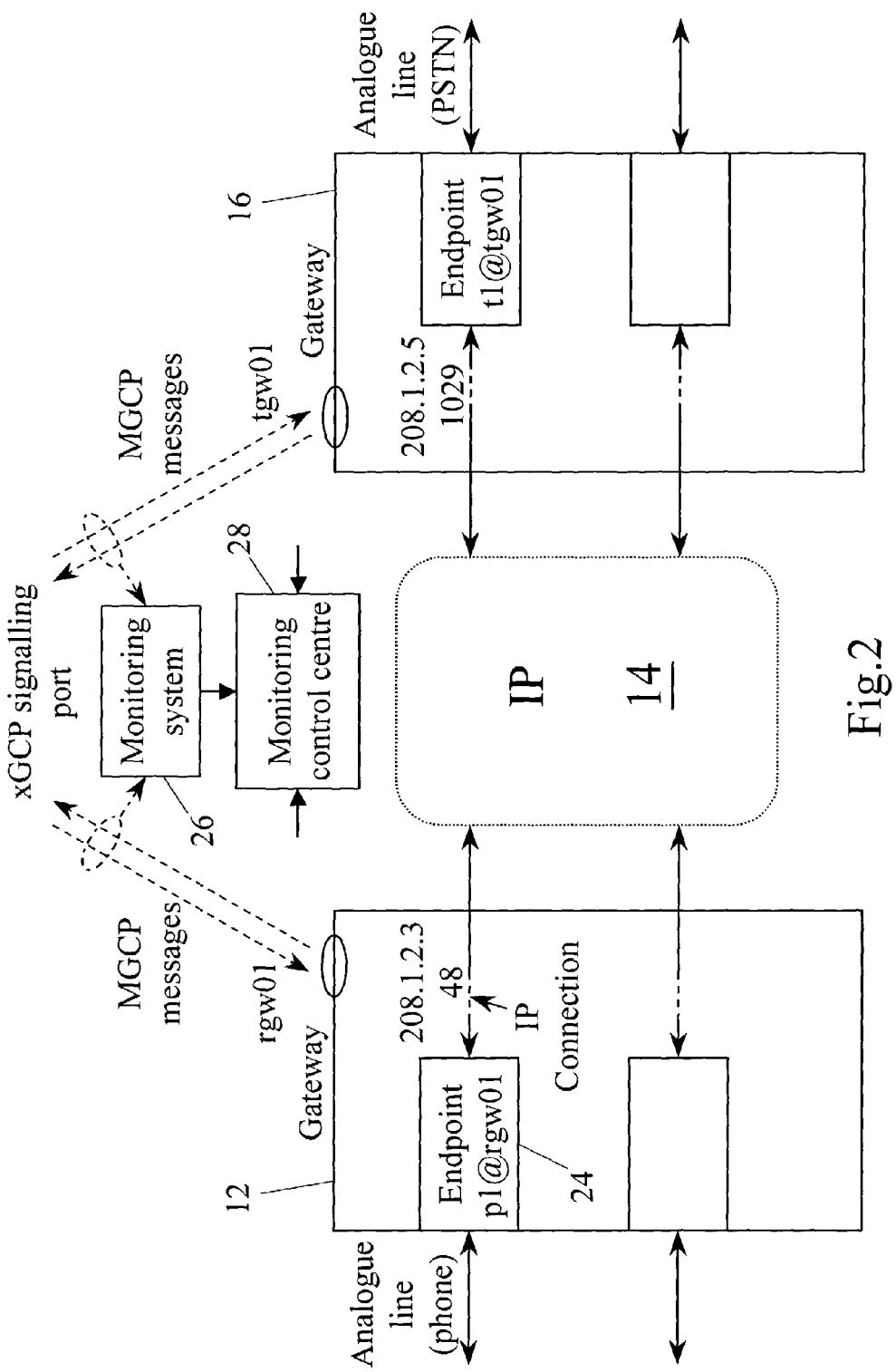
FIG. 2 shows part of the network of FIG. 1 in more detail.

FIG. 2 illustrates in more detail the functionality incorporated in the gateways 12 and 16. Referring to FIG. 2, the residential media gateway 12 implements endpoints, such as 24, which may for example be connected to external analogue phone lines such as that for the CPE 10 (FIG. 1). Each endpoint has a respective endpoint identifier, comprising the domain name of its gateway (such as rgw01 for the residential gateway 12) and a local name within the gateway (such as p1 for the endpoint 24). The residential gateway 12 also has links to the IP network 14 and can establish an IP connection between such a link and an endpoint in the gateway, by allocating IP resources within the gateway to that endpoint in order to create an IP session which is associated with the endpoint. The allocated IP resources include an IP address (such as 208.1.2.3) and a Real-time Transport Protocol (RTP) port number.

Figure 3:
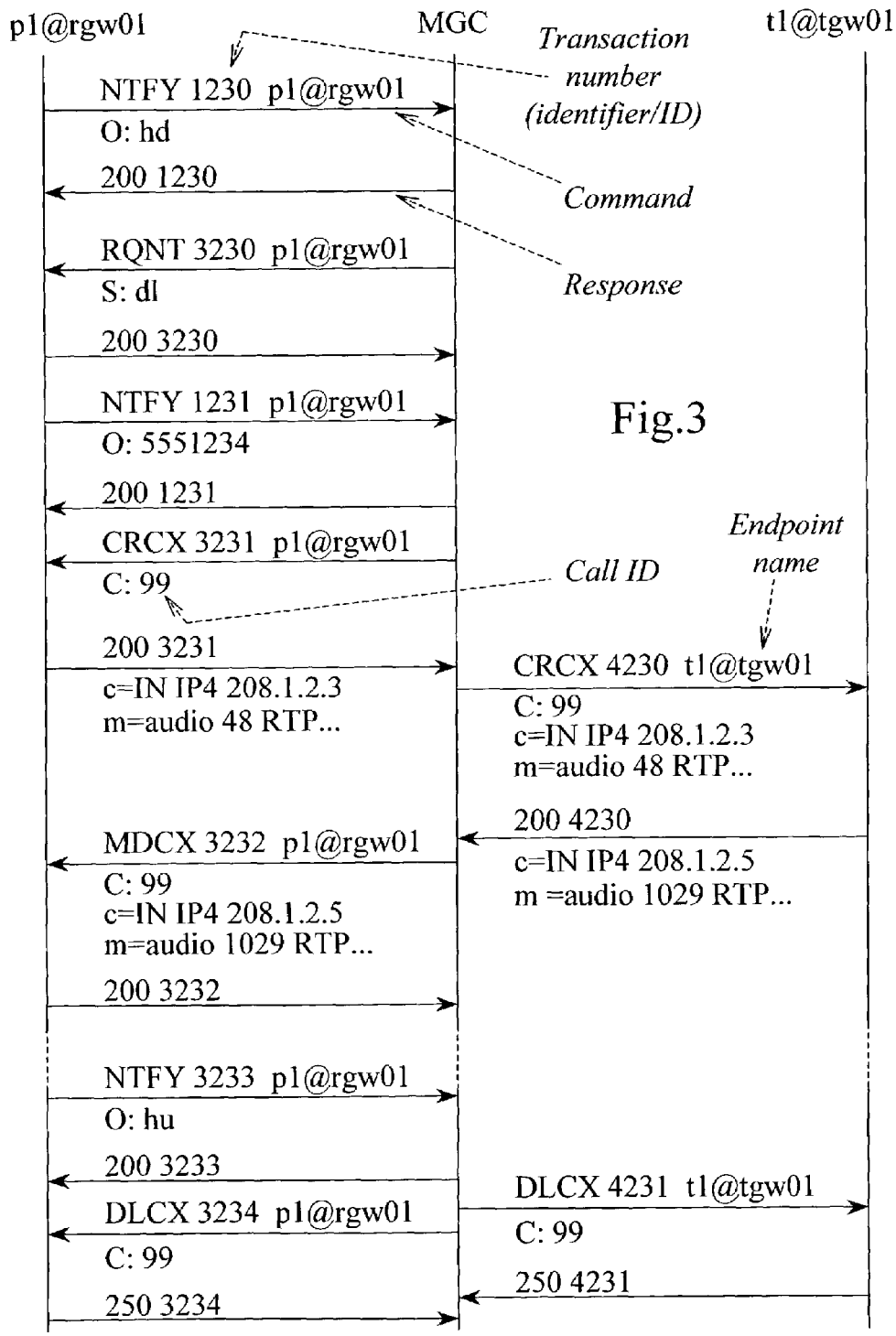
FIG. 3 shows a possible sequence of MGCP commands and responses used to set up a call across a network such as that of FIG. 1.

The residential gateway 12 shares information with the MGC 22 about the IP resources allocated to an endpoint involved in setting up a call, in a Session Description Protocol (SDP) session description, and the MGC 22 forwards this information to the trunk media gateway 16. This gateway implements endpoints (such as the endpoint t1@tgw01, connected to the PSTN) in the same manner as the residential gateway 12, and can likewise allocate IP resources (such as the IP address 208.1.2.5 and the RTP port 1029) in order to establish an IP connection between the IP network 14 and that endpoint. Information about these IP resources is shared by the trunk gateway 16 with the residential gateway 12 via the MGC 22. FIG. 3 shows the principal features of command and response messages exchanged in IP packets by the MGC 22 with the gateways 12 and 16 to set up and clear a call through the IP network 14.

Referring to FIG. 3, the endpoints p1@rgw01 and t1@tgw01 in the gateways 12 and 16 respectively are represented by the left- and right-hand vertical lines, and the MGC 22 is represented by the central vertical line. Messages passed in IP packets between these units are represented by horizontal arrows, and time runs down the page.

It is assumed that the MGC 22 has previously sent a NotificationRequest (RQNT) command to the residential gateway 12, instructing it to monitor its endpoints for various specified events, including an off-hook transition of associated CPEs, and to notify the MGC 22 of the occurrence of these events. When the endpoint p1@rgw01 detects that the CPE 10 connected to it has gone off-hook, it sends a Notify command to the MGC 22. This command includes a transactionID or transaction number 1230 assigned by the residential gateway 12, the identity of the relevant endpoint, and an O parameter hd identifying the observed (off-hook) event.

The MGC 22 sends a response (200 1230) confirming reception of the Notify command (identified by its transactionID), and follows this with a NotificationRequest command with an S parameter dl instructing the endpoint to apply dial tone to the connected phone line. After sending a response to this command the residential gateway 12 collects digits dialled by the customer and then sends a Notify command to the MGC 22 with an O parameter containing the dialled number. The MGC 22 confirms reception of this command, and reacts by sending back a CreateConnection command for the residential gateway 12 to allocate resources to the endpoint p1@rgw01 for the required call. This command includes a C parameter giving the call a unique CallID identifier (99). A resulting response from the gateway 12 confirms creation of the required connection to the endpoint p1@rgw01 and provides an SDP description of this connection, including the IP address (208.1.2.3) and the RTP port (48) to be used.

The MGC 22 forwards this SDP description to the trunk media gateway 16 in another CreateConnection command (transactionID 4230), together with the relevant CallID, and the gateway sends a response with the SDP description of the connection it consequently creates to the endpoint t1tgw01 specified in the CreateConnection command. This second SDP description is provided by the MGC 22 to the residential media gateway 12 by means of a ModifyConnection command (transactionID 3232), including the CallID to identify the relevant call. The gateway 12 sends a response to this command, and thereafter transfer of media (e.g. voice call data) directly between the endpoints in the two gateways 12 and 16, via the IP network 14, can take place.

When the transfer has been completed and the customer hangs up, the residential media gateway 12 detects and signals this event to the MGC 22 with a Notify command containing the appropriate O parameter hu. The MGC responds by sending DeleteConnection commands containing the relevant CallID to both the gateways 12 and 16, which react by removing the associated connections for the specified endpoints (and thus releasing the related IP resources) and sending back confirmatory response messages (250 and transactionID).

The wide variety of different messages and associated parameters involved in the procedure outlined in FIG. 3 preclude simple correlation of the messages to assemble a Call Detail Record (CDR) for a call which is set up using media gateways in the manner described. For example, there is no counterpart to the combination of originating point code (OPC), destination point code (DPC) and circuit-identification code (CIC) which can be used to associate SS7 signalling messages all relating to the same call uniquely with one another —the unique CallID in the CreateConnection command is not necessarily present in every MGCP message. Nonetheless, call monitoring, fraud detection, billing verification and other network management functions require the availability of CDRs for calls set up via distributed telecommunications switches. The present invention enables such CDRs to be assembled from the MGCP messages (or messages generated in accordance with other functionally similar protocols such as Megacop/H.248). The example described below is discussed for convenience in the context of MGCP messages. However, references to MGCP terminology and concepts, such as endpoint and CallID, are to be taken as embracing references to equivalent terminology and concepts for implementation in the context of Megacop/H.248 (e.g. substituting termination for endpoint and Context ID for CallID).

To this end, the MGCP signalling links connecting the media gateways 12 and 16 to the MGC 22 are provided with a passive monitoring device 26 as shown in FIG. 2. For this purpose equipment of similar functionality to Agilent acceSS7 monitoring equipment for SS7 links may be used, with interfaces adapted to match the communications technology used for the MGCP IP links. The monitoring device 26 detects all MGCP messages traversing the links between the MGC 22 and the gateways 12 and 16 and generates timestamped copies of them, without affecting the transmission of the MGCP messages themselves. These copies are then transferred, for example via a local area network, to a monitoring control centre 28, which typically comprises data storage equipment and associated data processing equipment operating under the control of appropriate software program instructions to perform the required analyses of the data collected.

Figure 4A:
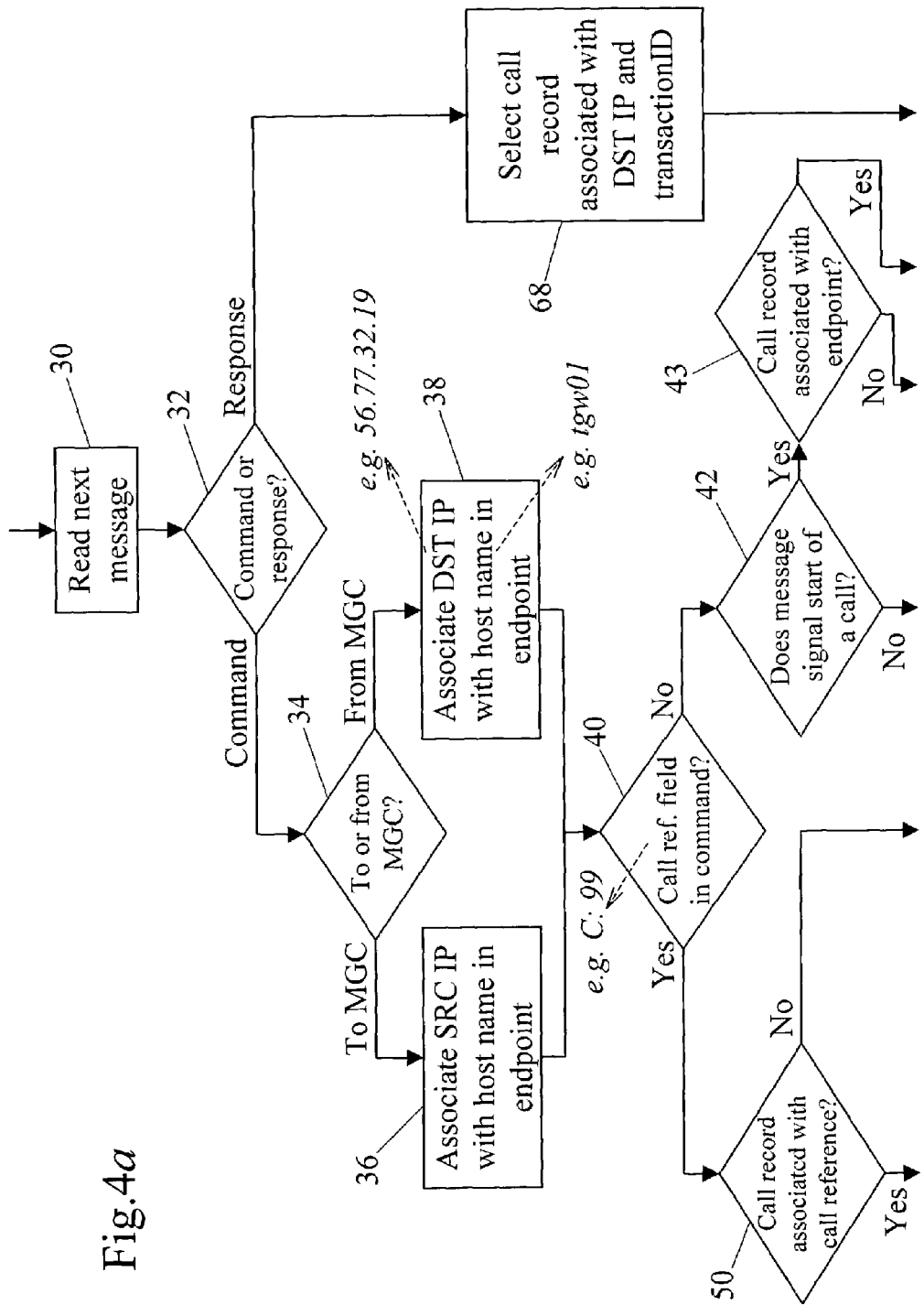
FIGS. 4a and 4b comprise a flowchart describing a procedure according to the invention for assembling a call detail record for the call set up by the command sequence of FIG. 3.
Figure 4B:
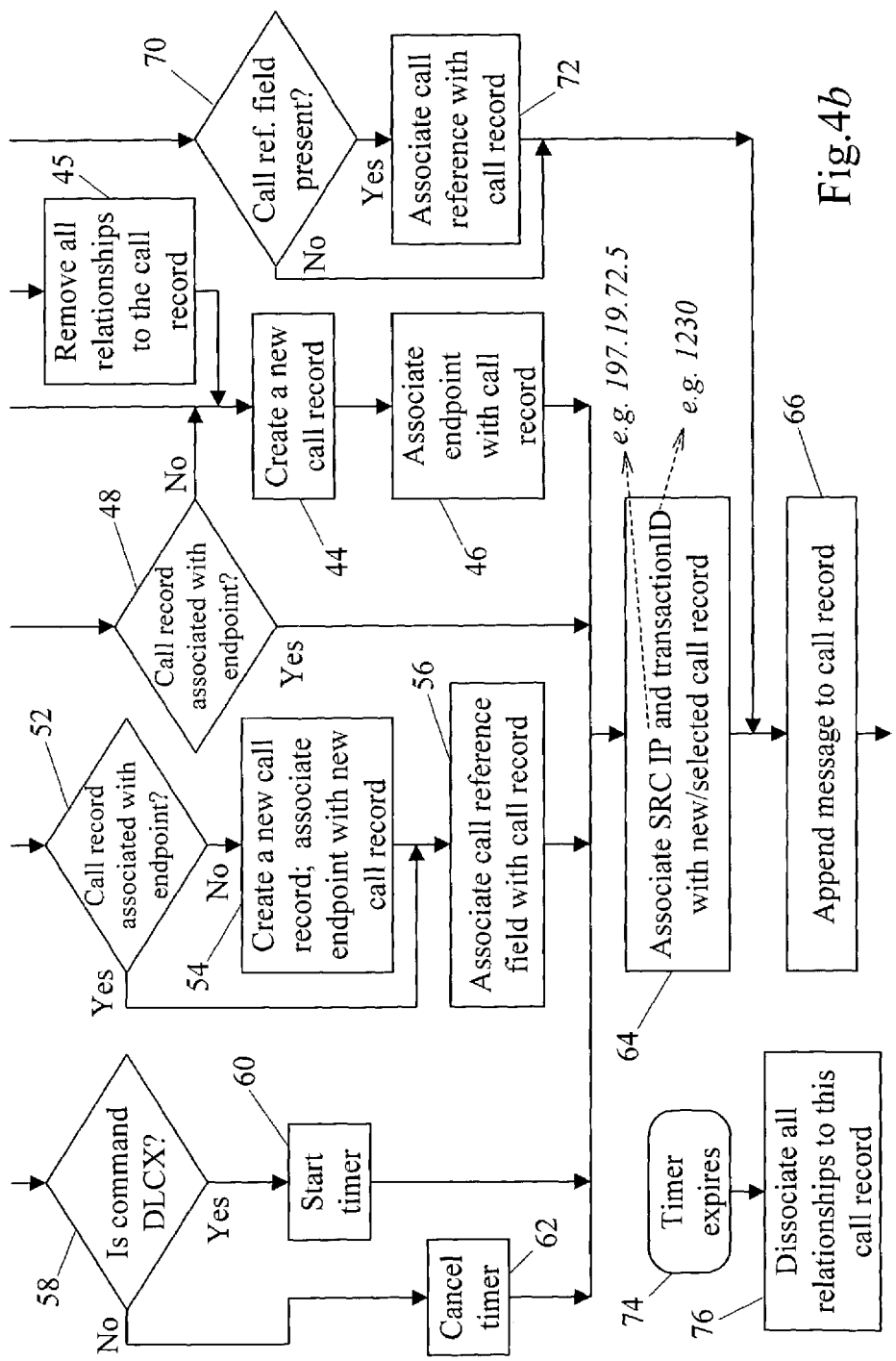

FIGS. 4a and 4b show a procedure in accordance with this invention for assembling CDRs using the copied MGCP messages. Referring to FIGS. 4a and 4b, the procedure reads each stored MGCP message copy in turn, as represented at step 30, and then tests at step 32 whether the message is a command message, such as NotificationRequest or Notify, or a response to such a message. In the case where it is a command, the procedure advances to step 34 and tests whether the command message has been sent to or from the MGC 22. For a message sent to the MGC 22 the procedure implements step 36, to create a temporary association between the source IP address for MGCP IP packets sent by the gateways and the host name in the endpoint specified in the command message (e.g. the host name rgw01); for a message sent from the MGC 22 a counterpart step 38 is implemented, to create a temporary association between the destination IP address for the MGCP IP packets and the endpoint's host name. These temporary associations may involve, for example, creating entries in index tables held in the data storage equipment. The associations enable either one of the IP address and the host name to be determined by reference to the other, and permit meaningful names (as distinct from more obscure IP addresses) to be included in displays of call records. They also enable commands and responses to be matched, by correlating source IP address and transaction number for a command with (the same) destination IP address and transaction number for a response.

After implementing either step 36 or 38, the procedure continues to step 40, to test whether a "call reference" field is present in the command message. As used herein, a call reference is a set which contains one or both of the following members:

a CallID (C parameter) appearing in an MGCP message;
an (IP address, RTP port number) component of an SDP connection description within an MGCP message.

For example an MGCP message
CRCX 1205 card23/21@tgw-7.example.net SGCP 1.0
C: A3C47F21456789F0
L: p:10, a:G.711;G.726-32
M: sendrecv v=0
c=IN IP4 128.96.41.1
m=audio 3456 RTP/AVP 0 96
a=rtpmap:96 G726-32/8000 has a call reference with two members {(128.96.41.1, 3456), A3C47F21456789F0}. The term call reference is used herein to refer collectively to parameters which can be used jointly or individually to identify associations between different messages.

If a call reference field is not present, a further test is made at step 42 to determine whether the message signals the start of a call (i.e. a Notify command with an O parameter hd). If the message does signify the start of a call, a second test is performed at step 43 to find whether an existing call record is already associated with the endpoint identified in the command message. If not, a new call record is created at step 44 (e.g. a new entry is created in a call record table held in the data storage equipment, together with entries in associated index tables). Then at step 46 the endpoint identified in the command message is associated with the new call record (e.g. by entering that endpoint name in an appropriate field in the call record). Thereafter the procedure continues to a step 64 described below.

If the test at step 43 establishes that an existing call record is already associated with the endpoint in question, the relationships between that call record and the endpoint are removed at step 45, after which a new call record is created at step 44 as described above.

If the test at step 42 shows that the command message does not signify the start of a call, the procedure moves to step 48 where a test is made to determine whether there is already a call record associated with the endpoint identified in the command message. If not the procedure implements steps 44 and 46 described above; otherwise the procedure advances to the step 64 described subsequently.

If the test at step 40 establishes that a call reference is present in the command message, another test at step 50 is carried out to find whether an existing call record is already associated with any member of that call reference. If there is no such call record another test is made at step 52, to find whether an existing call record is already associated with the endpoint identified in the command message; if no call record is associated with the endpoint a new call record is created, at step 54, and the endpoint specified in the message is associated with the new record. At step 56 the call reference field specified in the message is associated with the relevant call record (either as already found to exist at step 52 or as created at step 54). As many associations are established with the call record as there are members of the call reference.

If the test at step 50 does locate a call record associated with the call reference, a further test is made at step 58 to determine whether the message is a DeleteConnection (DLCX) command. If so, a timer for the call is started at step 60, and if not the timer is cancelled at step 62—in either case the procedure then continues to step 64. The timer specifies a waiting period to cater for the possibility that another connection might be established for the call; when the timer expires (as indicated at 74), indicating that no further connection is being made, the call can be treated as having ended and the temporary association between the call record and the endpoint is terminated (76). This ensures that a subsequent message involving that endpoint (for example for an incoming call to the CPE 10 associated with the endpoint) will be correctly recognized as relating to a new call. Detection of any command other than DLCX with the relevant call reference at step 58 indicates that another connection is being established in the call, in which case the timer is cancelled at step 62 to maintain the association of the current call record with the endpoint.

Following steps 46 and 56, or after affirmative results from the tests at steps 48 and 50, the procedure advances to step 64, where the source IP address and the transaction number (transactionID) specified in the command message are associated with the relevant call record which has already been created or identified prior to reaching step 64.

Finally, at step 66, the message itself is appended to the call record, and thereafter the overall procedure is repeated to examine another stored message copy.

In the case where the test at step 32 determines that the message copy being examined is a response message, the procedure implements step 68 to select the existing call record associated with the destination IP address and the transaction number contained in the message. Then the procedure tests whether a call reference field is present in the message, at step 70. If so, the call reference member or members are associated at step 72 with the existing call record selected at step 68, in order to cater for situations in which a different call reference member (e.g. CallID) is used for messages from different gateways relating to the same call. Thereafter, or if the call reference field is not present, the procedure continues to step 66 described above.

FIGS. 3, 4*a* and 4*b* deal primarily with the case of an outbound call being made by the CPE 10 associated with the endpoint in the residential media gateway 12. For an inbound call to the CPE the first message is a CreateConnection (CRCX) command to the trunk media gateway 16, followed by a CRCX command to the residential media gateway 12 with an S parameter rg, to cause the CPE 10 to ring. The CRCX command must include the associated unique CallID, the presence of which will be detected at step 40 causing the procedure to continue to step 50 and ultimately to create a new call record.

As a result of applying this procedure to a series of MGCP messages, the following correlations are accomplished:

commands are matched with the associated responses (by reference to the IP addresses of MGCP packets and the transactionID—steps 64 and 68);

commands and responses are associated with the part of a call route involving a specific endpoint (by reference to the endpoint names contained in the command messages—steps 46, 48, 52 and 54); and different parts of a call's route involving different endpoints are associated with one another (by reference to one or more call reference members (CallIDs, endpoints' IP addresses and RTP UDP port numbers) contained in certain command messages—steps 50, 56 and 72).

Further associating all these correlations together in a call detail record enables all the component messages to be correlated with one another, irrespective of the different identifying information contained in different messages. Thus a call record such as that shown in FIG. 5 is produced for use by other application programs, for example for monitoring quality of service or for billing purposes.

The invention claimed is:

1. A method of generating a call detail record for a telecommunications call established via a media gateway under the control of a media gateway controller, comprising the steps of:

detecting messages exchanged between media gateways and at least one media gateway controller;

locating identification information within the messages;

associating command messages with corresponding response messages in accordance with a first kind of identification information;

associating command and response messages relating to a specific gateway in accordance with a second kind of identification information;

associating messages relating to different gateways in accordance with a third kind of identification information; and combining the messages which have been associated with one another to produce a call detail record.

2. The method of claim 1, wherein the first kind of identification information comprises gateway transaction identification information.

3. The method of claim 2, wherein the first kind of identification information includes message addressing information.

4. The method of claim 3, wherein the message addressing information comprises Internet Protocol addresses.

5. The method of claim 1, wherein the second kind of identification information comprises names of media end points within the gateways.

6. The method of claim 1, wherein the third kind of identification information comprises unique identifiers for identifying calls established via a media gateway.

7. The method of claim 1, wherein the third kind of identification information comprises Internet Protocol addresses for bearer data paths in the call together with associated port addresses.

8. The method of claim 1, wherein message addressing information is associated with names of media end points within the gateways.

9. The method of claim 1, wherein a temporary association is made between a call and a name of a media end point within a gateway, and the temporary association is terminated after a predetermined time has elapsed following termination of a connection set up between two gateways for that call.

10. The method of claim 1, wherein the media gateways and the media gateway controller communicate in accordance with the Media Gateway Control Protocol.

11. Apparatus for generating a call detail record for a telecommunications call established via a media gateway under the control of a media gateway controller, comprising:

a monitor for detecting messages exchanged between media gateways and at least one media gateway controller;

a locator for locating identification information within the messages;

an associator for associating command messages with corresponding response messages in accordance with a first kind of identification information, for associating command and response messages relating to a specific gateway in accordance with a second kind of identification information, and for associating messages relating to different gateways in accordance with a third kind of identification information; and a combiner for combining the messages which have been associated with one another to produce a call detail record.

12. The apparatus of claim 11, wherein the first kind of identification information comprises gateway transaction identification information.

13. The apparatus of claim 12, wherein the first kind of identification information includes message addressing information.

14. The apparatus of claim 13, wherein the message addressing information comprises Internet Protocol addresses.

15. The apparatus of claim 11, wherein the second kind of identification information comprises names of media end points within the gateways.

16. The apparatus of claim 11, wherein the third kind of identification information comprises unique identifiers for identifying calls established via a media gateway.

17. The apparatus of claim 11, wherein the third kind of identification information comprises Internet Protocol addresses for bearer data paths in the call together with associated port addresses.

18. The apparatus of claim 11, wherein the associator is arranged to associate message addressing information with names of media end points within the gateways.

19. The apparatus of claim 11, wherein the associator is arranged to (a) makes a temporary association between a call and a name of a media end point within a gateway, and (b) terminate the temporary association after a predetermined time has elapsed following termination of a connection set up between two gateways for that call.

20. The apparatus of claim 11, wherein the media gateways and the media gateway controller are arranged to communicate in accordance with the Media Gateway Control Protocol.

* * * * *